US007908740B2

(12) United States Patent
Hasiak et al.

(10) Patent No.: US 7,908,740 B2
(45) Date of Patent: Mar. 22, 2011

(54) METHOD AND APPARATUS FOR MANUFACTURING HUB ASSEMBLIES

(75) Inventors: Brian Hasiak, Macomb, MI (US); Brian V. Vloch, Macomb, MI (US)

(73) Assignees: Reinhold H. Spiess, Shelby Township, MI (US); Cynthia Lynn Spiess, Shelby Township, MI (US)

( * ) Notice: Subject to any disclaimer, the term of this patent is extended or adjusted under 35 U.S.C. 154(b) by 0 days.

(21) Appl. No.: 12/715,040

(22) Filed: Mar. 1, 2010

(65) Prior Publication Data

US 2010/0199490 A1 Aug. 12, 2010

Related U.S. Application Data

(62) Division of application No. 11/781,678, filed on Jul. 23, 2007, now Pat. No. 7,673,390.

(60) Provisional application No. 60/834,516, filed on Jul. 31, 2006.

(51) Int. Cl.
*B21D 53/10* (2006.01)
(52) U.S. Cl. .................. 29/724; 29/898.06; 29/898.062; 29/898.07
(58) Field of Classification Search ............... 29/898.06, 29/898.062, 898.07, 724; 384/37
See application file for complete search history.

(56) References Cited

U.S. PATENT DOCUMENTS

| | | | |
|---|---|---|---|
| 2,172,145 A | 9/1939 | Rehnberg |
| 2,222,605 A | 11/1940 | Carlson |
| 2,334,227 A | 11/1943 | Stallman |
| 2,639,498 A | 5/1953 | Rookstool |
| 2,860,406 A | 11/1958 | Reichardt |
| 3,014,267 A | 12/1961 | Horvath |
| 3,259,962 A | 7/1966 | Taylor |
| 3,345,723 A | 10/1967 | Stilla et al. |
| 3,789,478 A | 2/1974 | Stenger |
| 4,166,660 A | 9/1979 | Murphy |
| 4,175,319 A | 11/1979 | Frauenhoffer et al. |
| 4,357,749 A | 11/1982 | Lira |
| 4,425,703 A | 1/1984 | Rise |
| 4,596,472 A | 6/1986 | Vezirian |
| 4,837,910 A | 6/1989 | Nantel |
| 5,184,402 A | 2/1993 | Kadokawa |
| 6,568,859 B1 | 5/2003 | Stegmeier |
| 6,725,531 B2 | 4/2004 | Takiwaki |
| 2009/0067762 A1 | 3/2009 | Muterspaw |

*Primary Examiner* — David P Bryant
*Assistant Examiner* — Ryan J Walters
(74) *Attorney, Agent, or Firm* — Gifford, Krass, Sprinkle, Anderson & Citkowski, P.C.

(57) ABSTRACT

A method and apparatus for assembling bearings and a stub into a bore of a hub. The apparatus includes a block defining a receiving position for the hub. A feed mechanism arranges plurality of bearings in the form of an annular array. A first mandrel is axially displaceable toward one side of the hub to push the annular array of bearings into the bore of the hub. A second mandrel is axially displaceable toward an opposite side of the hub to push a stub within the annular array of bearings in the bore of the hub. The stub includes at least one outwardly biased detent for retaining the bearings in the hub.

11 Claims, 6 Drawing Sheets

METHOD AND APPARATUS FOR MANUFACTURING HUB ASSEMBLIES

REFERENCE TO RELATED APPLICATIONS

This application is a Division of application Ser. No. 11/781,678 filed on Jul. 23, 2007, which claims priority to U.S. provisional patent application No. 60/834,516, which was filed Jul. 31, 2006 and is incorporated herein by reference in its entirety.

FIELD OF THE INVENTION

This invention relates generally to a method and apparatus for assembling bearings into a cylindrical opening formed within hubs, gears, bearings, joints and the like.

BACKGROUND OF THE INVENTION

It is known as disclosed in U.S. Pat. No. 4,837,910 to assemble needle bearings into an annular layer array using a mandrel to insert the array into a cylindrical opening in a receiving machine. The mandrel is centered within the bore of a recover block to define an annular space into which a discrete number of needle bearings are singularly fed from a specially configured track which holds the vertical serpentine column of needle bearings. A push rod engages the column to positively force a discrete number of bearings into the space while a grease packing is inserted about the bearings as they fill the space. After the bearings are positioned about the mandrel and grease has been injected about the needle bearings, the mandrel is moved axially to transfer the bearings into the hub of a gear. The bearings are held in place by the grease, but may still become dislodged during transport of the bearings. Thus, it remains desirable to provide an improved method and apparatus for assembling and retaining needle bearings in the cylindrical opening of gears, bearings, joints and the like.

SUMMARY OF THE INVENTION

According to one aspect of the invention, a method is provided for manufacturing a hub assembly. The method includes the steps of: placing a hub having a bore at a receiving position so that the bore is presented for receiving a plurality of bearings and the stub from opposite sides of the hub; inserting a plurality of bearings together into the bore from one side of the hub; inserting a stub having an outwardly biased detent into the bore from an opposite side of the hub; and biasing the bearings radially and circumferentially with the stub to facilitate retention of the bearings in the bore during transport of the hub assembly from the receiving position.

According to another aspect of the invention, an apparatus is provided for assembling bearings and a stub into a bore of a hub. The apparatus includes a block defining a receiving position for the hub. A feed mechanism arranges a plurality of bearings in the form of an annular array. A first mandrel is axially displaceable toward one side of the hub to push the annular array of bearings into the bore of the hub. A second mandrel is axially displaceable toward an opposite side of the hub to push a stub within the annular array of bearings and, thereby, retain the array of bearings in the bore of the hub.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
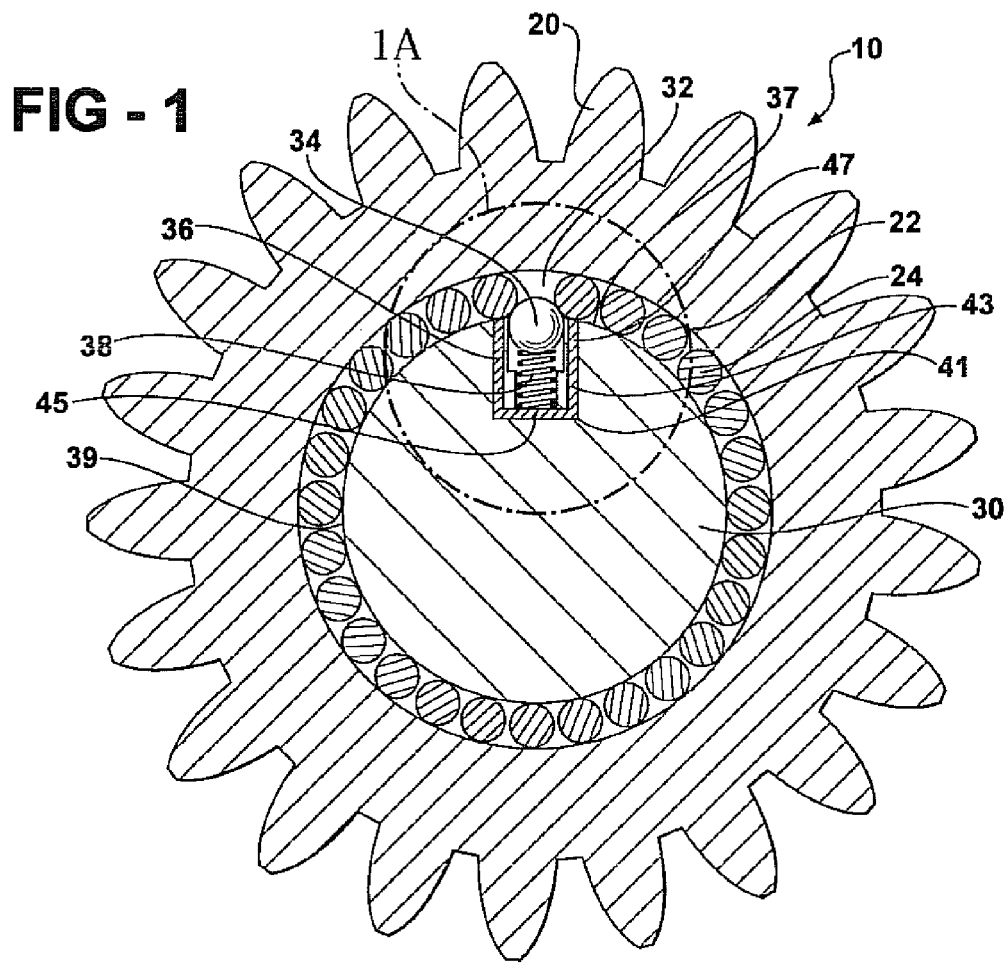
FIG. 1 is a cross sectional view of the hub assembly according to an embodiment of the invention, taken through a plane as indicated at 1-1 in FIG. 5.
Figure 1A:
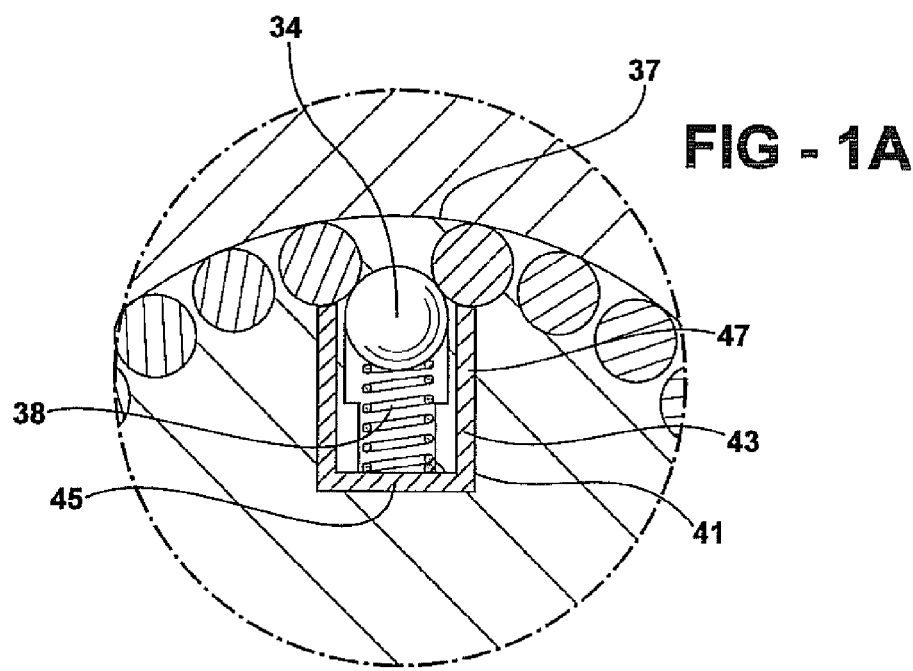
FIG. 1A is a closeup of the detent of FIG. 1.

Referring to FIG. 1, a hub assembly is generally indicated at 10. The hub assembly 10 includes a hub 20 having a center bore 22 and a plurality of bearings 24 arranged as an annular array along an inner cylindrical surface defining the bore 22. The hub 20 is shown illustratively as a spur gear. It should, however, be readily appreciated by those having ordinary skill in the art that the hub member can be any other type of gear, bearing, joint or hub-shaped member. Described in detail below, the invention includes a method and apparatus for automated installation of the bearings 24 into the bore 22 of the hub 20 and insertion of a stub 30 into the bore 22 to hold the bearings 24 in place until a subsequent operation, in which the stub 30 is removed and replaced by a receiving shaft of a final assembly. The removed stub 30 may be re-used to form another hub assembly.

The stub 30 is generally cylindrically shaped. The stub 30 includes a detent 32 that biases the bearings 24 radially outwardly against the inner cylindrical surface of the bore 22 and circumferentially against each other, thereby creating sufficient friction to hold the bearings 24 in place within the hub 20 while the hub 20 is being transported to another location for the subsequent operation.

In the illustrated embodiment, the detent 32 includes a ball 34 and a biasing member 38 disposed within a generally cylindrical tube 41. The tube 41 is fixedly secured to or otherwise press fit into a diametric transverse bore 36 formed in the stub 20. The tube 41 has a closed end 45 and an opposite open end 47. The biasing member 38 is disposed within the tube 41 between the ball 34 and the closed end 45. Illustratively, the biasing member 38 is shown as a compressed helical spring, though any suitable biasing member may be used. The biasing member 38 continuously biases the ball 34 generally radially outwardly and the open end 47 of the tube 41 is slightly deformed or crimped to retain the ball 34 in the tube 41, so that a portion of the ball 34 protrudes outwardly from an outer surface 39 of the stub 30. Insertion of the stub 30 into the bore 22 within the annular array of bearings 24 causes the ball 34 to be displaced slightly inwardly against the force of the biasing member 38. The outward bias of the ball 34 against at least one of the bearings 24 creates a compression force in the radial and/or circumferential directions, which increases friction to facilitate retention of the bearings 24 within the bore 22 of the hub 20.

Alternatively, the ball 34 and spring 38 may be disposed in the bore 36 without the tube 41. In this case, an edge 37 defining the opening leading into the bore 36 would have a smaller diameter than the ball 34 to retain the ball 34 in the bore 36. The size of the opening leading into the bore 36 may be reduced after insertion of the ball 34 into the bore 36 by deforming the edge 37 inwardly toward the axis of the bore 36.

It should be readily appreciated that the stub 30 may include a plurality of detents 32 that are longitudinally offset to meet the requirements of a particular application, such as for use in a hub member having a plurality of bearing races. In this case, the detents may also be circumferentially aligned or offset. The detents may also have different size and may utilize biasing members with different spring constants.

Referring to FIGS. 2-6, a hub assembly apparatus is generally indicated at 40. The hub assembly apparatus 40 includes a mandrel 42 that extends through a generally cylindrical hole 44 formed in a fixed block 46. The block 46 includes a first end 46a opposite a second end 46b. The mandrel 42 is centered in the hole 44 to define an annular space 48. The mandrel 42 is disposed on the first end 46a of the block 46 and is also slidably supported by a sleeve 49 that is, in turn, slidably coupled to the block 46. The sleeve 49 is disposed adjacent to the annular space 48 and has a thickness slightly less than that of the annular space 48 so as to be receivable therein. The hub assembly apparatus 40 includes a bearing feeder 50 that delivers a discrete number of bearings 24 to the annular space 48 and arranges the bearings 24 in an annular array disposed in the annular space 48. Optionally, grease may be fed into the annular space for lubricating the bearings 24. The mandrel 42 and sleeve 49 together move axially between the first and second ends 46a, 46b of the block 46 to displace the annular array of bearings 24 into the bore 22 of the hub 20, as indicated by the arrow in FIG. 2. Optionally, the mandrel may include an annular surface facing the hub for displacing the array into the hub instead of the sleeve.

The hub assembly apparatus 40 also includes a hub feeder 60 that delivers and locates a hub 20 to a receiving position defined in the block 46, in which the bore 22 of the hub 20 is substantially axially aligned with the annular array of bearings 24 and the mandrel 42. A detailed description of the hub assembly apparatus as described above is provided in U.S. Pat. No. 4,837,910, the content of which is incorporated herein by reference in its entirety.

The hub assembly apparatus 40 of the present embodiment includes a stub feeder 70 that delivers and locates a stub 30 to a delivery position, in which the stub 30 is generally coaxially aligned with the bore 22 of the hub 20. A second mandrel 72 is spaced apart and opposite the first mandrel 42. The stub 30 and the hub 20 are disposed between the first and second mandrels 42, 72. The second mandrel 72 is generally coaxially aligned with the first mandrel 42. The second mandrel 72 is movable in a generally axial direction between the First and second ends 46a, 46b of the block so as to move toward the hub 20 and push the stub 30 into the bore 22 of the hub 20 generally concentric between the annular array of bearings 24.

The first 42 and second mandrels 72 are arranged on opposite sides of the hub 20 for displacing the array of bearings 24 and the stub 30, respectively, into the bore 22 from opposite sides of the hub 20. The mandrels 42, 72 may be displaced by any suitable actuator and actuator coupling mechanism known by those having ordinary skill in the art.

In operation, the bearing feeder 50, hub feeder 60 and stub feeder 70 provide a supply of bearings, hubs and stubs to the receiving position for automated assembly of a plurality of hub assemblies 10 by the hub assembly apparatus 40. Referring to FIG. 6, the bearing feeder 50 includes a magazine 51 that delivers the supply of bearings 24 to the annular space 48. The stub feeder 70 includes a ramp 71 that delivers the supply of stubs 30 between the second mandrel 72 and the hub 20. The hub feeder 60 includes a ramp 61 that delivers the supply of hubs 20 to the receiving position. Insertion of a plurality of bearings 24 and a stub 30 into a hub 20 is illustrated by the sequence of FIGS. 2 through 5.

Figure 2:
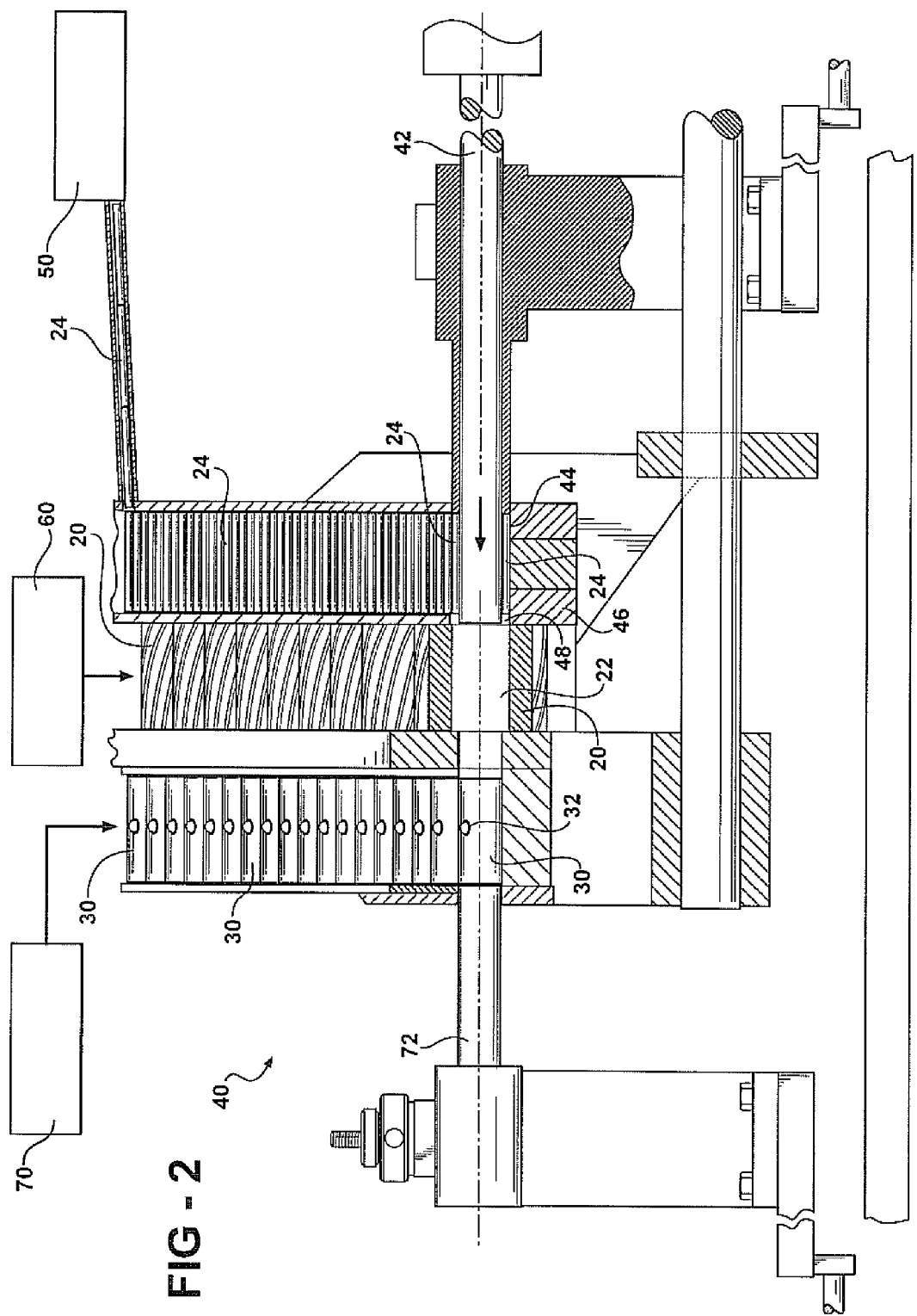
FIG. 2 is a cross sectional view of an apparatus for assembling the hub assembly of FIG. 1, shown with a hub in a receiving position ready for receiving a plurality of bearings.

In FIG. 2, a plurality of bearings 24 are arranged in an annular array in the annular space 48. The mandrel 42 and sleeve 49 move axially together in the direction of the arrow to displace the annular array of bearings 24 into the bore 22 of the hub 20.

Figure 3:
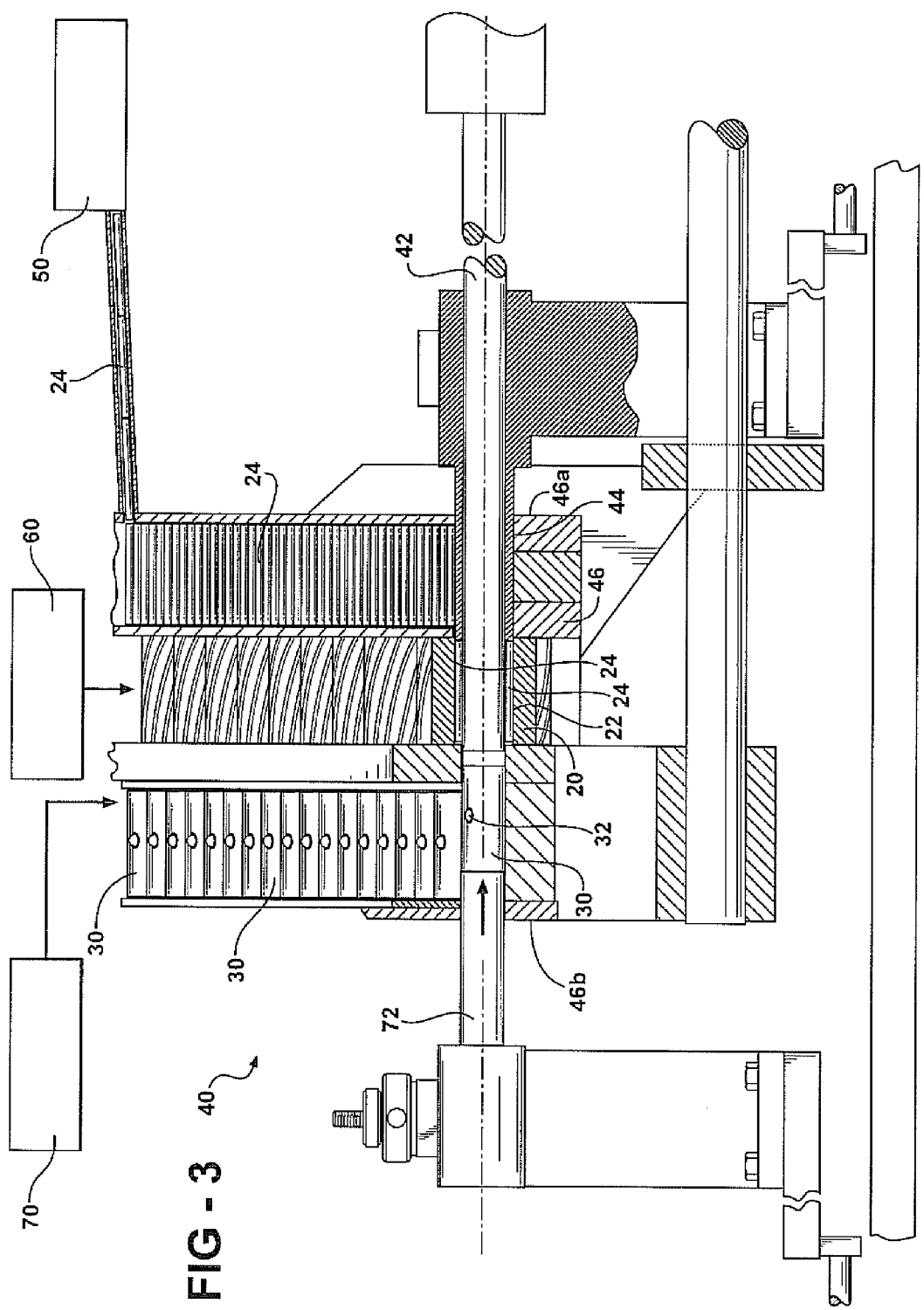
FIG. 3 is a cross sectional view of the apparatus with the bearing inserted into a bore in the hub, just prior to insertion of a stub for holding the bearings within the bore of the hub.

In FIG. 3, the bearings 24 are inserted into the bore 22 by the axial movement of the mandrel 42 and sleeve 49. The stub 30 is displaced in the direction of the arrow by the second mandrel 72. The mandrel 42 is retracted from the bore 22. The sleeve 49 remains in place to hold the bearings 24 in the bore 22 during insertion of the stub 30 and retraction of the mandrel 42. In one embodiment, the stub 30 is inserted into the bore 22 after retraction of the mandrel 42. In another embodiment, the stub 30 is inserted into the bore 22 as the mandrel 42 is retracted. In still another embodiment, the mandrel 42 is pushed out of the bore 22 as the stub 30 is pushed into the bore by the second mandrel 72.

Figure 4:
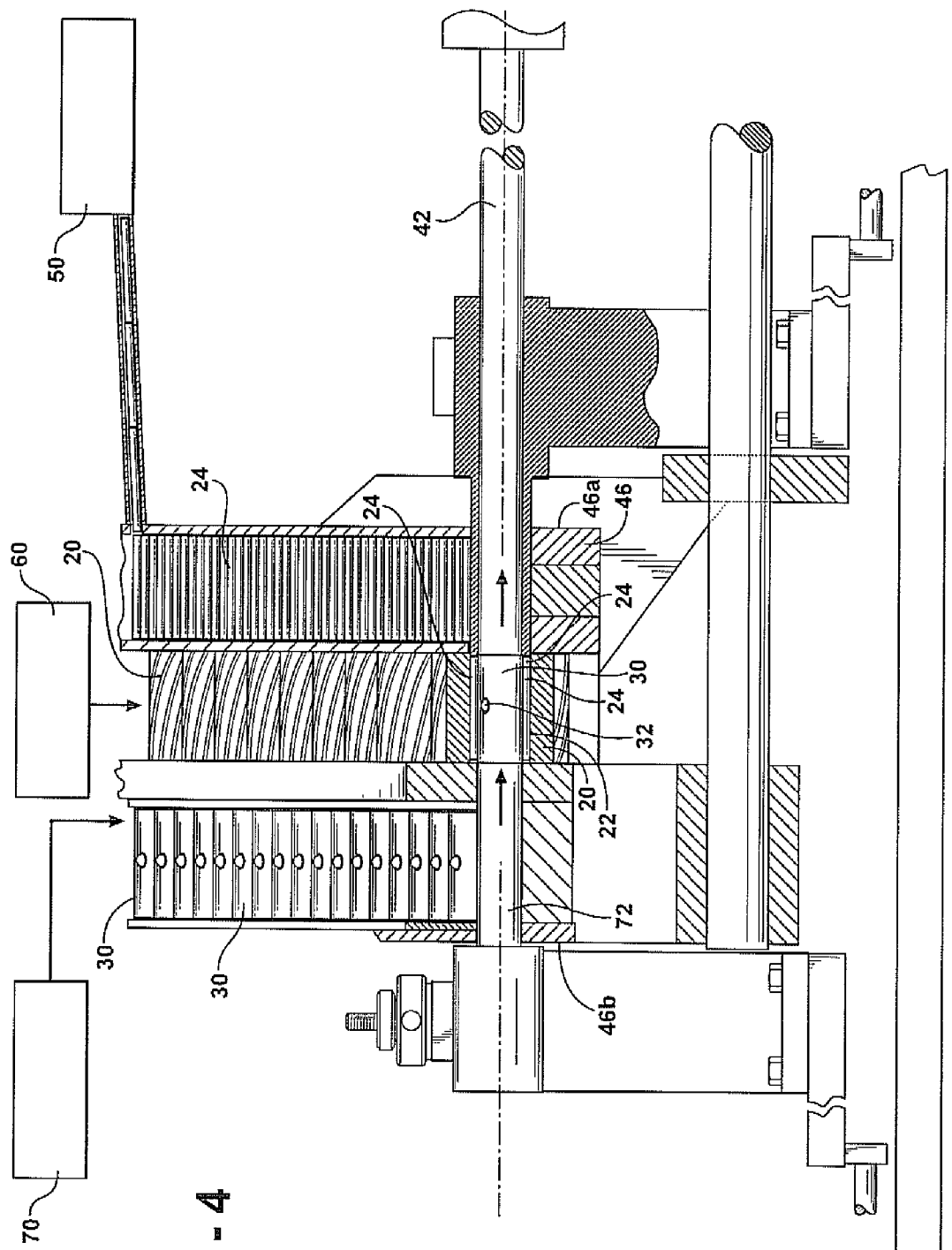
FIG. 4 is a cross sectional view of the apparatus showing the stub inserted into the bore of hub for retaining the bearings in place.

In FIG. 4, the stub 30 is shown in the bore 22 and generally concentric within the annular array of bearings 24. The ball 34 is displaced slightly inwardly against the force of the biasing member 38 due to contact between the ball 34 and at least one of the bearings 24 in the array. The outward bias of the ball 34 relative to the stub 30 eliminates slack between the bearings 24 to facilitate retention of the bearings 24 in the hub 20. The mandrel 42 is displaced from the bore 22.

The hub assembly 10 exits from the receiving position along an exit ramp 61. The hub assembly 10 can then be transported to another location for installation onto a shaft of a final assembly (not shown). The bearings 24 are held in place by the stub 30 during transportation. In the final assembly, the stub 30 is removed and replaced with the shaft of the final assembly. The removed stub 30 may be reused by returning the removed stub 30 to the stub feeder 70 in the machine 40 to form part of another hub assembly 10, as described above.

Figure 5:
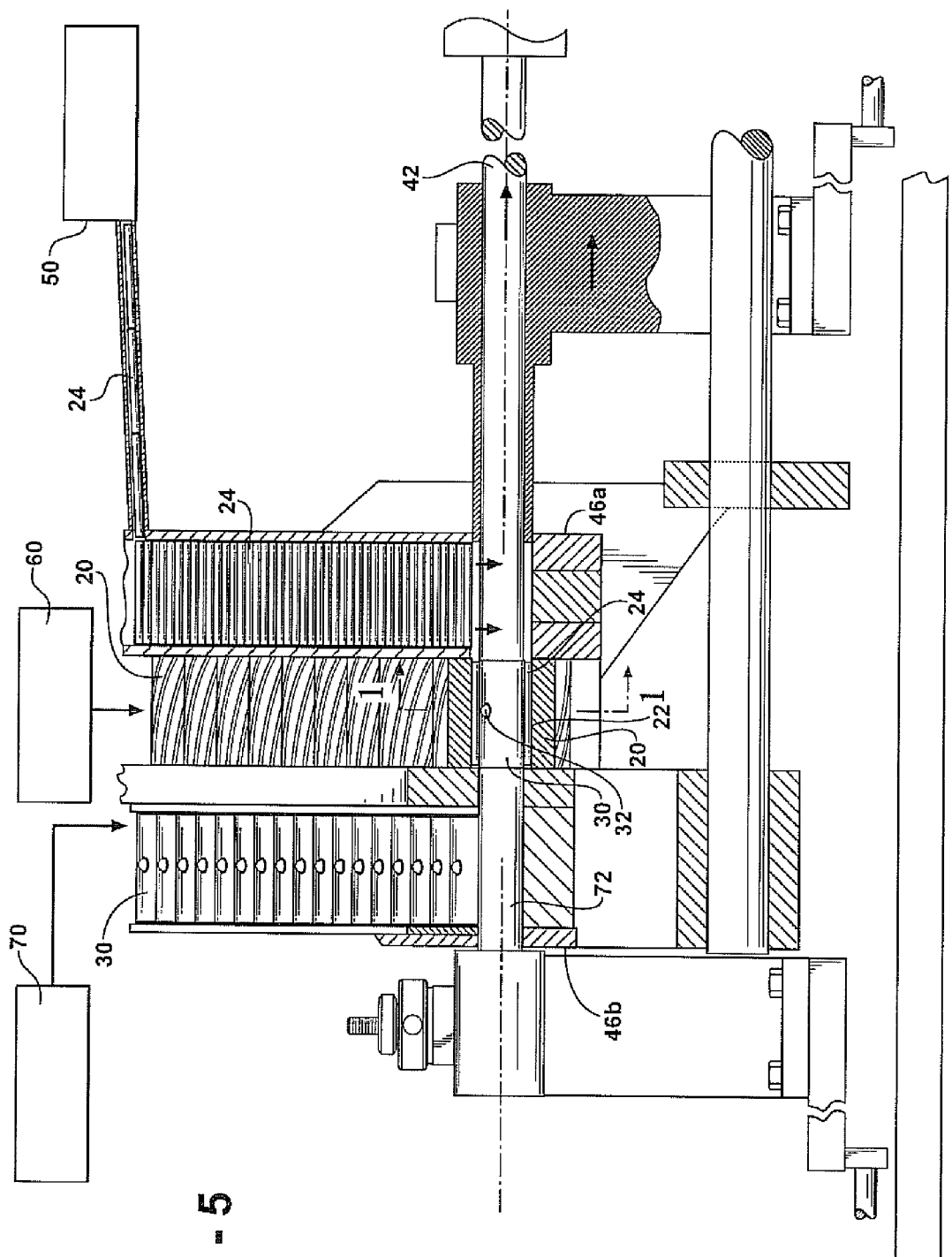
FIG. 5 is a cross sectional view of the apparatus of FIG. 2, showing a completed hub assembly prior to exiting the receiving position.
Figure 6:
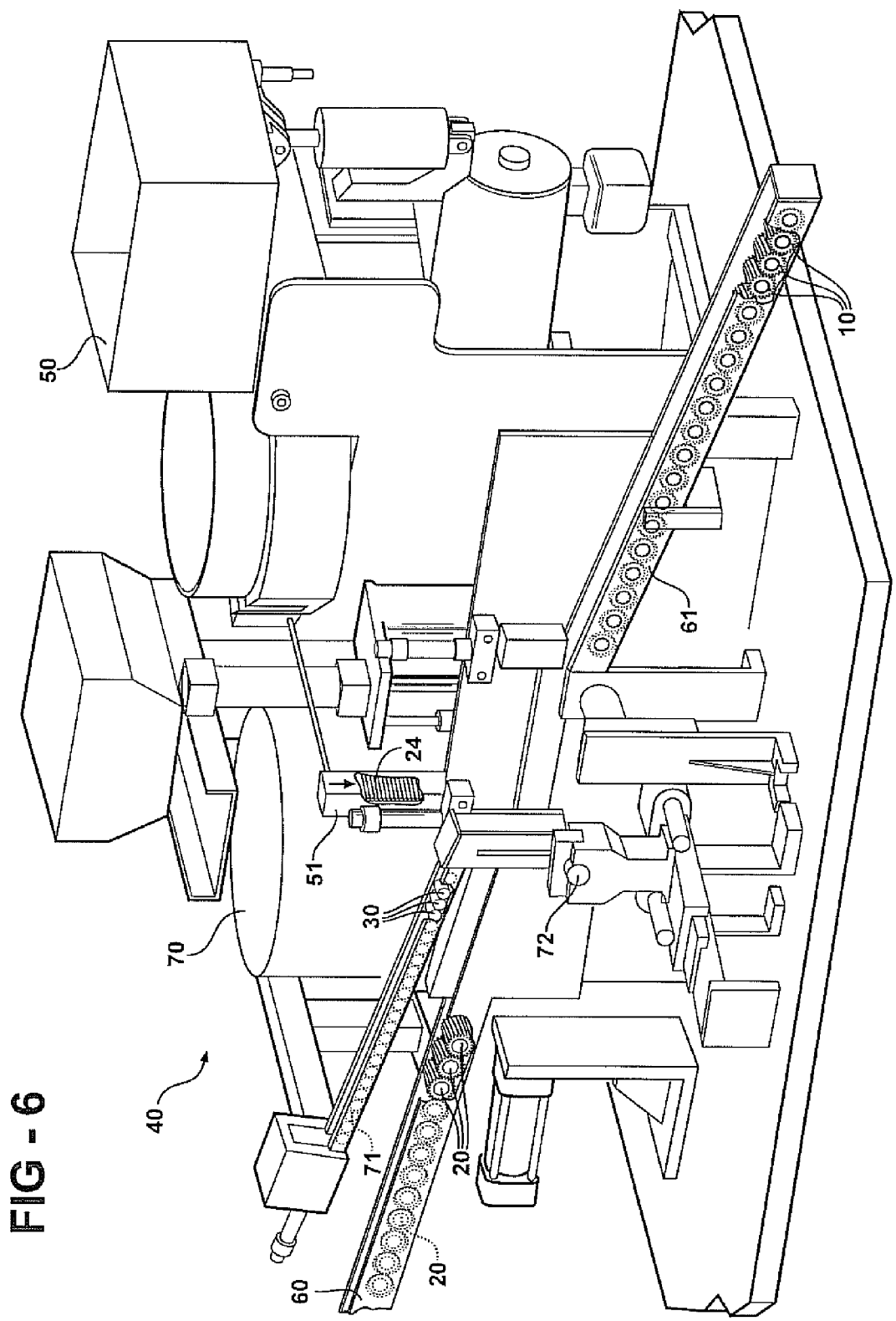
FIG. 6 is a perspective view of the apparatus of FIGS. 2-5.

In FIG. 5, the sleeve 49 is retracted to allow an arrangement of another plurality of bearings 24 into the annular space 48 to begin another hub assembly cycle, as described above.

The invention has been described in an illustrative manner. It is, therefore, to be understood that the terminology used is intended to be in the nature of words of description rather than of limitation. Many modifications and variations of the invention are possible in light of the above teachings. For example, the movements of the mandrels and sleeve, as described above, can be automated using conventional actuators, such as hydraulic cylinders or motors. The aforementioned steps can be automated, manual driven, or any combination thereof. Thus, within the scope of the appended claims, the invention may be practiced other than as specifically described.

The invention claimed is:

1. An apparatus for assembling bearings into a bore of a hub, the bore extending between opposite ends of the hub, the apparatus further including a block for supporting the hub, the block having a first end opposite a second end, and a feed mechanism disposed on the first end of the block, the feed mechanism arranging a plurality of bearings in the form of an annular array, said apparatus comprising:

a stub having an outwardly biased detent; and a first mandrel spaced opposite and apart from a second mandrel, the stub and hub disposed between the first and second mandrel, the first mandrel axially displaceable between the first and second ends of the block so as to displace the annular array of bearings into the bore of the hub, the second mandrel axially displaceable between the first and second ends of the block so as to push the stub axially into the hub and displace the first mandrel from the bore and maintain the bearings in the annular array within the bore of the hub, the detent being outwardly biased against at least one of the bearings to create a radial and/or circumferential force that enhances friction to retain the bearings within the bore of the hub.

2. The apparatus as set forth in claim 1, including a sleeve having a cylindrical bore, the bore receiving the first mandrel therethrough.

3. The apparatus as set forth in claim 2, wherein the sleeve and first mandrel are axially displaceable together toward the hub to displace the annular array of bearings into the bore of the hub.

4. The apparatus as set forth in claim 3, wherein the first mandrel is axially movable away from the hub to accommodate insertion of the stub during movement of the second mandrel toward the hub.

5. The apparatus as set forth in claim 4, wherein the sleeve remains stationary and maintains the bearings in the hub during movement of the first mandrel away from hub and during insertion of the stub into the array of bearings.

6. The apparatus as set forth in claim 4, wherein the sleeve remains stationary and maintains the bearings in the hub during insertion of the stub into the array of bearings.

7. The apparatus as set forth in claim 1, wherein the stub includes a plurality of detents.

8. The apparatus as set forth in claim 7, wherein the plurality of detents are circumferentially offset.

9. The apparatus as set forth in claim 7, wherein the plurality of detents are longitudinally offset.

10. The apparatus as set forth in claim 7, wherein the plurality of detents have different sizes.

11. The apparatus as set forth in claim 7, wherein the plurality of detents include biasing members having different spring constants.

* * * * *